(12) United States Patent
Schendel

(10) Patent No.: US 6,374,673 B1
(45) Date of Patent: Apr. 23, 2002

(54) VELOCITY SENSOR

(75) Inventor: Robert E. Schendel, Kingwood, TX (US)

(73) Assignee: Texas Components Corporation, Houston, TX (US)

( * ) Notice: Subject to any disclaimer, the term of this patent is extended or adjusted under 35 U.S.C. 154(b) by 0 days.

(21) Appl. No.: 09/516,735

(22) Filed: Mar. 1, 2000

(51) Int. Cl.$^7$ ............................................... G01P 15/13
(52) U.S. Cl. ................... 73/514.08; 73/514.31
(58) Field of Search ......................... 73/514.07, 514.08, 73/514.31, 514.05, 514.06, 514.16, 514.39; 324/160, 173, 174, 179

(56) References Cited

U.S. PATENT DOCUMENTS

| | | |
|---|---|---|
| 2,797,912 A | 7/1957 | Trostler |
| 3,558,946 A | 1/1971 | Cory et al. ................. 310/112 |
| 4,043,204 A | 8/1977 | Hunter et al. |
| 4,692,614 A | 9/1987 | Wilson et al. ............. 250/231 |
| 4,845,988 A | 7/1989 | Russell et al. |
| 4,905,517 A | 3/1990 | Crowe et al. |
| 4,922,753 A | 5/1990 | Idogaki et al. |
| 4,991,438 A | 2/1991 | Evans |
| 5,756,896 A * | 5/1998 | Schendel ................. 73/514.08 |
| 5,780,741 A | 7/1998 | Raj |
| 5,908,987 A | 6/1999 | Raj |

FOREIGN PATENT DOCUMENTS

| | | |
|---|---|---|
| EP | 0 857 945 A2 | 8/1988 |
| GB | 2241785 A | 9/1991 |
| JP | 63-151862 | 6/1988 |
| JP | 63-151864 | 6/1988 |
| JP | 63-153472 | 6/1988 |
| SU | 466456 | 10/1975 |

\* cited by examiner

*Primary Examiner*—Helen Kwok
(74) *Attorney, Agent, or Firm*—McGlinchey Stafford, PLLC; Clarence Eriksen

(57) ABSTRACT

A velocity sensor is disclosed comprising a housing, a ferromagnetic fluid which substantially fills the housing, and a magnetic proof mass suspended in the ferromagnetic fluid. The magnetic proof mass has a cylindrical center portion and end portions which taper from the central portion to the poles of the proof mass.

8 Claims, 2 Drawing Sheets

VELOCITY SENSOR

BACKGROUND OF THE INVENTION

1. Field of the Invention

The present invention relates to apparatus for measuring velocity, and, more particularly, for measuring velocity in the range of interest in seismic exploration.

2. Description of the Prior Art

In seismic exploration, seismic waves are commonly used to probe the earth's crust as a means of determining the type and location of subsurface formations. The earth's crust can be considered a transmission medium or filter whose characteristics are to be determined by passing seismic waves through that medium. In the reflection seismic method, seismic waves are impulses are generated at a point at or near the earth's surface, and the compressional mode of those waves is reflected from subsurface acoustic impedance boundaries and detected by arrays of seismic detectors located at the surface of the earth. The seismic detectors convert the received waves into electrical signals which are sensed and recorded in a form which permits analysis. Skilled interpreters can discern from such an analysis the shape and depth of subsurface reflection boundaries, and the likelihood of finding an accumulation of minerals, such as oil and gas.

One type of seismic detector which has been utilized is a device having a proof mass suspended by one or more springs within a sensor housing such that the proof mass is limited in motion along the central axis of the housing. Such axial motion of the proof mass is opposed by the springs and is indicative of the velocity along the central axis. Such prior art devices are subject to variations in the spring length and in the modulus of elasticity of the springs due to temperature variations. Additionally, restraint of the proof mass from movement other than axially has tended to generate mechanical noise and erroneous measurements, as discussed in U.S. Pat. No. 5,756,896.

Other prior art in the field of the measurement of velocity has included the utilization of a magnetic or a permeable proof mass suspended in a ferro fluid within a sensor housing. The movement and positioning of the proof mass within the sensor housing is controlled by and often measured by variations in the magnetic field strength of an internal or external magnetic field. All of the known prior art apparatus which utilizes an external electromagnetic field to control the movement or positioning of the proof mass have a limit on sensitivity resulting from the noise inherent in the electrical/electronic circuits driving and/or comprising the electromagnetic field generator.

U.S. Pat. No. 5,756,896, which is incorporated herein by reference, discloses apparatus for measuring velocity over a wide range of values, which apparatus does not introduce noise into its proof mass detecting means. While the velocity sensor disclosed in the '896 patent was a substantial improvement over existing velocity sensors, certain characteristics of that velocity sensor, e.g., resonant frequency, tend to shift over time.

SUMMARY OF THE INVENTION

In accordance with the present invention, a velocity sensor having enhanced stability characteristics is provided. An embodiment of a velocity sensor in accordance with the present invention includes a housing and a magnetic proof mass suspended in the housing in a ferromagnetic fluid. The magnetic proof mass has a cylindrical central portion and end portions which are uniformly tapered from the central portion to the ends of the magnetic proof mass. A magnetic proof mass having this configuration has the a strongest magnetic field strength in the area of least diameter of the proof mass (i.e., the end of the tapered portion), which enhances the stability of the resonant frequency of the velocity sensor. Further, the magnetic proof mass in a velocity sensor according to the present invention has rounded ends, since magnetic ends with sharp edges tend to concentrate the magnetic fields near the sharp edges and thus, the effective fluid density in the area of the sharp edges.

In accordance with the present invention, it has also been found that stabilization of the resonant frequency of the velocity sensor may be enhanced by plating a portion of the central portion of the magnetic proof mass with a paramagnetic (i.e., weakly magnetic) coating to provide a minimum, constant shunt path for the magnetic particles in the ferromagnetic fluid.

A velocity sensor in accordance with the present invention also includes sharp edged caps, or rings, which are made of a non-magnetic material and which are mounted on the magnetic proof mass to ensure that the fluid flow around the magnetic proof mass is the same in all radial positions. These caps or rings function to minimize the distortion in the output of the velocity sensor.

The ferromagnetic fluid which is used in a velocity sensor according to the present invention comprises very fine magnetic particles which are coated with a specialized surfactant to promote colloidal suspension within a hydrocarbon solvent. An aggressive, non-hydrocarbon solvent is added to the ferromagnetic fluid in a relatively large quantity to keep the molecules of the surfactant spread apart at low temperatures. A commercially available pour point depressor is also added to the ferromagnetic fluid in very low quantities to compensate for the change in hydrocarbon solvent.

BRIEF DESCRIPTION OF THE DRAWINGS

In the accompanying drawings in which the same structure is identified with the same reference numerals.

DESCRIPTION OF SPECIFIC EMBODIMENTS

Figure 1:
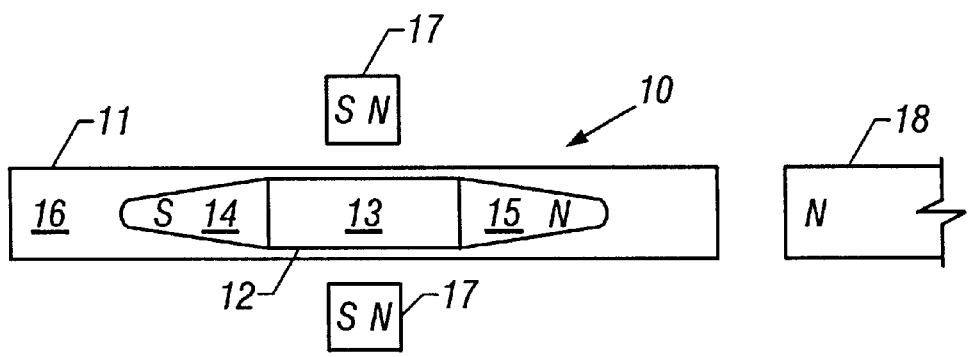
FIG. 1 is a cross-sectional drawing of a first embodiment of a sensor in accordance with the present invention.
Figure 2:
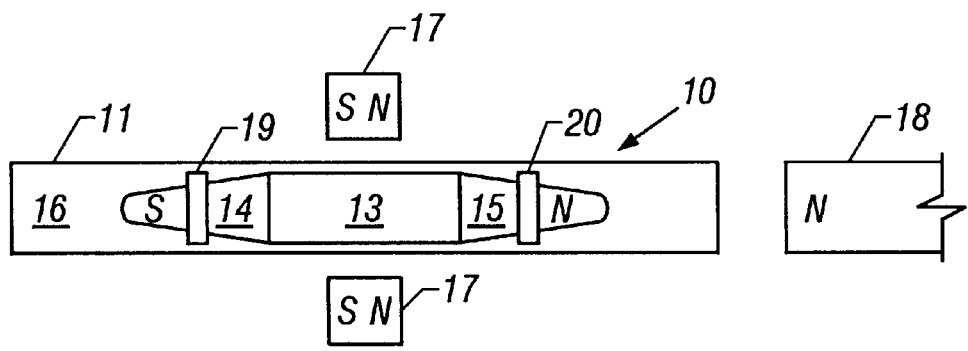
FIG. 2 is a cross-sectional drawing of a second embodiment of the present invention.
Figure 3:
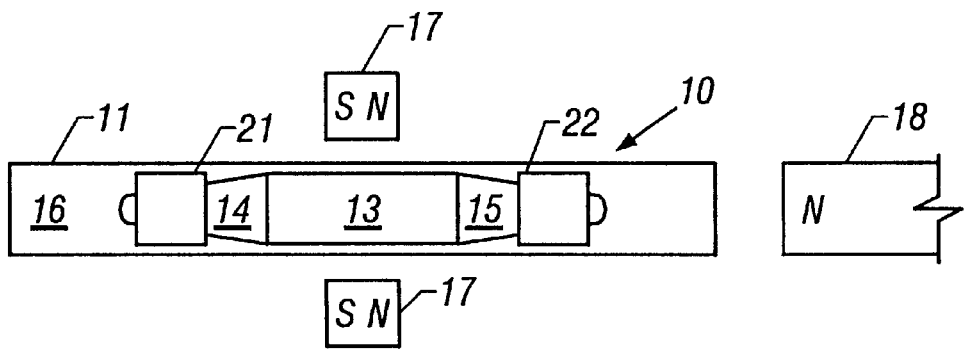
FIG. 3 is a cross-sectional drawing of a third embodiment of apparatus in accordance with the present invention.
Figure 4:
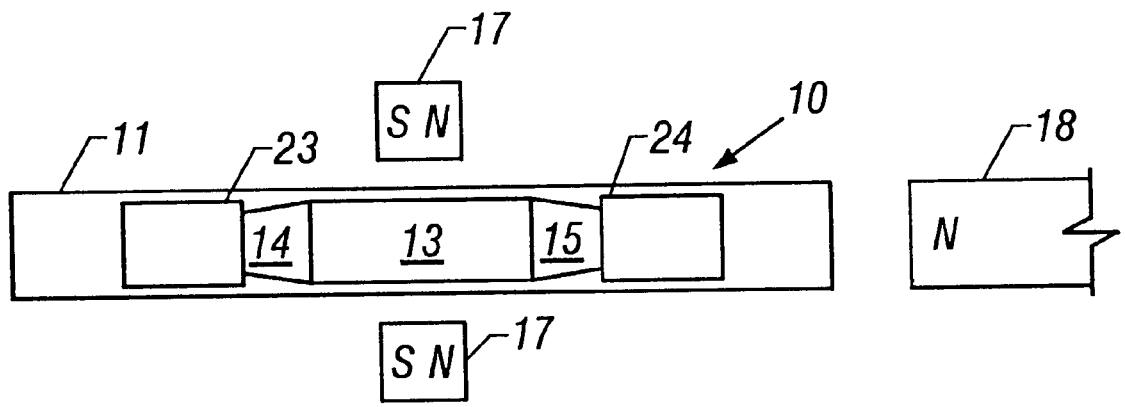
FIG. 4 is a cross-sectional drawing of a fourth embodiment of apparatus in accordance with the present invention.

All of the embodiments of the present invention shown in FIGS. 1–5 comprise a magnetic proof mass 12 which is suspended in a ferromagnetic fluid 16 within a sensor housing 11. In all embodiments of a sensor 10 in accordance with the present invention, the magnetic proof mass 12 has a central cylindrical portion 13 and tapered end portions 14 and 15, each of which taper away from the central portion 13. The ends of the tapered portions 14, 15 are rounded and are the poles of the magnetic proof mass 12. The south pole of magnetic proof mass 12 may be located at tapered end portion 14 and the north pole of magnetic proof mass 12 may be located at tapered end portion 15.

In all of the embodiments of the present invention described herein, the magnetic proof mass 12 may be constructed of Alnico 5 or Alnico 8 material. Preferably, however, magnetic proof mass 12 is constructed by molding a combination of plastic and magnetic materials in such ratios as would provide optimum physical and magnetic characteristics in a particular operation.

A magnetic proof mass 12 fabricated in accordance with the above criteria results in a velocity sensor which has a resonant frequency whose stability is enhanced. The areas of magnetic proof mass 12 which have the strongest magnetic field strength are the areas of least diameter, i.e., the pole of the ferromagnetic proof mass. The particles in the ferromagnetic fluid 16 are attracted to and pack most densely at these areas of strongest magnetic field strength. In general, this phenomenon increases the effective fluid density in these areas, reduces the effective mass of magnetic proof mass 12 due to buoyancy, and produces an upward shift in resonant frequency. However, with tapered ends, any shift in resonant frequency of the velocity sensor is minimized.

The stabilization of the resonant frequency of velocity sensor 10 is also enhanced by plating a portion of the central portion 13 of the magnetic proof mass 12 with a paramagnetic (i.e., weakly magnetic) coating. This coating may be a chrome, nickel or any other mildly magnetic plateable material and preferably comprises a pure molecular chromium. It has been discovered that without this coating, an area of low particle concentration would be created near the middle of magnetic proof mass 12, as the ferromagnetic particles move toward the poles of the proof mass, which results in an increase in the resonant frequency of velocity sensor 10. The paramagnetic coating provides a constant shunt path around magnetic proof mass 12 to minimize any increase in resonant frequency.

A velocity sensor in accordance with the present invention also minimizes distortion. Distortion in a velocity sensor as shown in FIGS. 1–5 is a function of how much input motion, in the long axis, is diverted to motion in any other axis. Since the ferromagnetic fluid 16 must flow around the magnetic proof mass 12 with a mechanical input, and since the moving magnet is a smooth shape, any radial non-uniformity of flow past the magnetic proof mass 12 will divert energy, which causes the proof mass 12 to tilt slightly, thereby increasing the distortion. In accordance with the present invention, distortion is minimized by mounting sharp edged caps 23, 24 (FIG. 4), or rings 21, 22 (FIG. 3) or 19, 20 (FIG. 2) on the magnetic proof mass 12, to ensure that the fluid flow around the proof mass is the same at all radial positions. The caps or rings may be fabricated from a non-magnetic material, e.g., plastic. Additionally, this effect may be achieved with the addition of a sleeve 30 with sharp edges around the central portion 13 as shown in FIG. 6.

In all embodiments, sensor 10 includes an apparatus for generating a magnetic field which is external to the sensor housing 11 and which opposes the magnetic field of the magnetic proof mass 12. This apparatus may comprise a ring magnet 17 which is centrally mounted around the sensor housing 11. Alternatively, this apparatus may comprise a bar magnet 18 which is located at one or both ends of the sensor housing 11. The apparatus for generating an external magnetic field may comprise any combination of the ring magnet 17 and bar magnet(s) 18.

In all embodiments of the present invention, sensor housing 11 is cylindrical in shape and is fabricated from Nitronic 50 Stainless Steel. The stainless steel housing prevents eddy currents from being set up in the internal surfaces of the sensor housing 11.

The ferromagnetic fluid 16 comprises very fine magnetic particles which are coated with a specialized surfactant to promote colloidal suspension within a hydrocarbon solvent. An aggressive, non-hydrocarbon solvent is added to the ferromagnetic fluid in a relatively large quantity to keep the molecules of the surfactant spread apart at low temperatures. The non-hydrocarbon solvent must have a low change in viscosity with temperature and must be an effective solvent for both hydrocarbon and fluorocarbon surfactants. Such solvents are preferably the newer bromonated solvents such as 1-bromopropane or 2-boromopropane, and stabilized 1-bromopropane is presently the preferred solvent. A commercially available pour point depressor is also added to the ferromagnetic fluid in very low quantities to compensate for the change in hydrocarbon solvent. A lubricant is also added to the ferromagnetic fluid in very low quantities.

Figure 5:
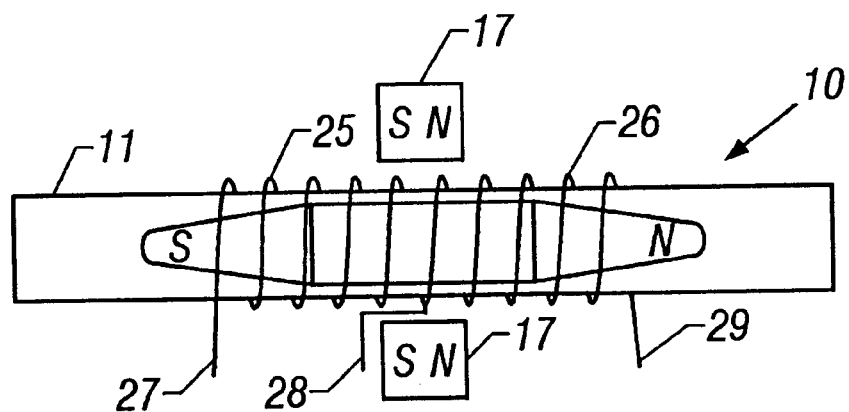
FIG. 5 is a cross-sectional drawing of a fifth embodiment of apparatus in accordance with the present invention.
Figure 6:
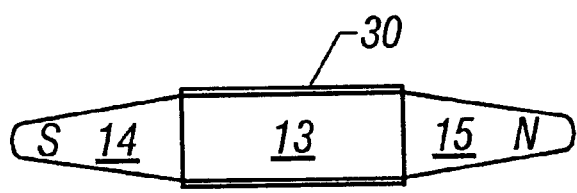
FIG. 6 is a cross-sectional drawing of a magnetic proof mass with a sleeve around the central portion of the proof mass.

With reference now to FIG. 5, any of the embodiments of the velocity sensor 10 shown in FIGS. 1–4 further comprises a suitable pickup coil which is wound on the exterior of housing 10. The pickup coil may comprise two halves of a single wound coil or two separately like-wound coils. In FIG. 5, two separately like-wound coils 25 and 26 are illustrated. The ends of each coil 25, 26 proximate the center of the housing 11 are joined together in a common connection 28. The coils 25, 26 are wound such that any noise from an external source will develop identical voltages across each coil. The respective outputs 27 and 29 of pickup coils 25 and 26 may advantageously be coupled to the inputs of a differential amplifier (not shown), and the identical voltages developed across the pickup coils by noise will cancel each other at the input to this amplifier.

In operation, the sensor housing 11, with its associated and physically attached magnetic field generators 17 and/or 18 and pickup coils 25–26 are attached to the body whose acceleration is to be measured. The magnetic proof mass 12 is a body at rest which tends to remain at rest. The magnitude of the acceleration between the magnetic proof mass 12 and the sensor housing 11 is represented by the differential between the voltages at the outputs 27 and 29 of the pickup coils 25 and 26. The differential between the voltages at the outputs 27 and 29 will not, in general, be a linear function of the magnitude of the velocity, but must, rather, be plotted for various known values of velocity.

What is claimed is:

1. A velocity sensor, comprising:

a housing;

a ferromagnetic fluid which substantially fills the housing;

a magnetic proof mass which is suspended within the housing by the magnetic force field created between a magnetic proof mass and the ferromagnetic fluid, the magnetic proof mass having a generally cylindrical shaped central portion and two end portions which taper from the central portion to poles of the proof mass; and a least one magnetic field external to the housing which is aligned in opposition to the magnetic field created by the magnetic proof mass.

2. The velocity sensor of claim 1, further comprising a plating of paramagnetic material on the central portion of the magnetic proof mass.

3. The velocity sensor of claim 2, further comprising a non-magnetic ring which is attached to each tapered portion of the magnetic proof mass.

4. The velocity sensor of claim 2, further comprising a non-magnetic cap which attaches to each end of each tapered portion of the magnetic proof mass.

5. The velocity sensor of claim 2, further comprising a sleeve which is mounted on the central portion of the magnetic proof mass.

6. The velocity sensor of claim 1, further comprising a non-magnetic ring which is attached to each tapered portion of the magnetic proof mass.

7. The velocity sensor of claim 1, further comprising a non-magnetic cap which is attached to the tapered portion of the magnetic proof mass.

8. The velocity sensor of claim 1, further comprising a sleeve which is mounted to the central portion of the magnetic proof mass.

* * * * *

UNITED STATES PATENT AND TRADEMARK OFFICE
CERTIFICATE OF CORRECTION

PATENT NO.    : 6,374,673 B1
DATED         : April 23, 2002
INVENTOR(S)   : Robert E. Schendel It is certified that error appears in the above-identified patent and that said Letters Patent is hereby corrected as shown below:

<u>Column 3,</u>
Line 7, "Le.," should be -- i.e., --

Signed and Sealed this

Eighth Day of October, 2002

Attest:

JAMES E. ROGAN
Attesting Officer    Director of the United States Patent and Trademark Office